United States Patent [19]

Clendinning et al.

[11] Patent Number: 4,687,833

[45] Date of Patent: Aug. 18, 1987

[54] CHAIN-EXTENDED POLY(ARYL ETHER KETONES)

[75] Inventors: Robert A. Clendinning, New Providence; George T. Kwiatkowski, Green Brook, both of N.J.

[73] Assignee: Amoco Corporation, Chicago, Ill.

[21] Appl. No.: 882,207

[22] Filed: Jul. 3, 1986

Related U.S. Application Data

[63] Continuation of Ser. No. 757,932, Jul. 23, 1985, abandoned.

[51] Int. Cl.[4] ............................................. C08G 8/02
[52] U.S. Cl. .................................... 528/125; 528/126; 528/128; 528/173; 528/174; 528/176; 528/179; 528/182; 528/190; 528/193; 528/194
[58] Field of Search ............... 528/125, 126, 128, 173, 528/174, 176, 179, 182, 190, 193, 194

[56] References Cited

U.S. PATENT DOCUMENTS

| | | | |
|---|---|---|---|
| 3,065,205 | 11/1962 | Bonner, Jr. ......................... | 528/190 |
| 3,764,583 | 10/1973 | Newton et al. ..................... | 528/125 |
| 3,993,628 | 11/1976 | Jarrett et al. ...................... | 528/125 |
| 4,010,147 | 3/1977 | Rose .................................. | 528/174 |
| 4,036,815 | 7/1977 | Feasey et al. ...................... | 528/174 |
| 4,039,511 | 8/1977 | Wulff et al. ........................ | 528/125 |
| 4,051,109 | 9/1977 | Barr et al. .......................... | 528/125 |
| 4,186,262 | 1/1980 | Freeman et al. ................... | 528/125 |
| 4,200,727 | 4/1980 | Blinne et al. ...................... | 528/125 |
| 4,339,568 | 7/1982 | Maresca ............................. | 528/125 |
| 4,398,020 | 8/1983 | Rose .................................. | 528/125 |

Primary Examiner—Lucille M. Phynes
Attorney, Agent, or Firm—Donald M. Papuga; William H. Magidson; Ralph C. Medhurst

[57] ABSTRACT

Described herein are novel crystalline chain extended poly(aryl ether ketones) which display excellent toughness, fabricability and very good high temperature and solvent resistance.

11 Claims, No Drawings

CHAIN-EXTENDED POLY(ARYL ETHER KETONES)

This application is a continuation of prior U.S. application Ser. No. 757,932 filing date 7/23/85 abandoned.

FIELD OF THE INVENTION

This invention is directed to novel crystalline chain extended polymers containing segments of crystalline poly(aryl ether ketones). The novel materials are easy to prepare and display excellent toughness, fabricability, and very good high temperature and solvent resistance.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415-2427, Johnson et al., U.S. Pat. Nos. 4,108,837 and 4,175,175. Johnson et al. show that a very broad range of PAE can be formed by the nucleophilic aromatic substitution (condensation) "reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol. 22, August, pp. 1096-1103; Blundell et al., Polymer, 1983 vol. 24, August, pp. 953-958, Atwood et al., Polymer Preprints, 20, no. 1, April 1979, pp. 191-194; and Rueda et al., Polymer Commiunications, 1983, vol. 24, September, pp. 258-260. In early to mid-1970, Raychem Corp. commercially introduced a PAEK called STILAN TM, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values ($>50$ ft-lbs/in$^2$) in the tensile impact test (ASIM D-1822). They have potential for a wide variety of uses, but because of the significant cost to manufacture them, they are expensive polymers. Their favorable properties classes them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions generally display good toughness and acceptable mechanical properties.

THE INVENTION

The present invention describes chain extended poly(aryl ether ketone) polymers. Both the preparation of the starting poly(aryl ether ketone) segments and their subsequent coupling with a diphenol are performed via the nucleophilic route, i.e. using a base and an aprotic solvent. Products having superior toughness, good fabricability, and excellent solvent and temperature resistance are obtained.

The polymers of the instant invention are prepared by the process shown in the equations that follow:

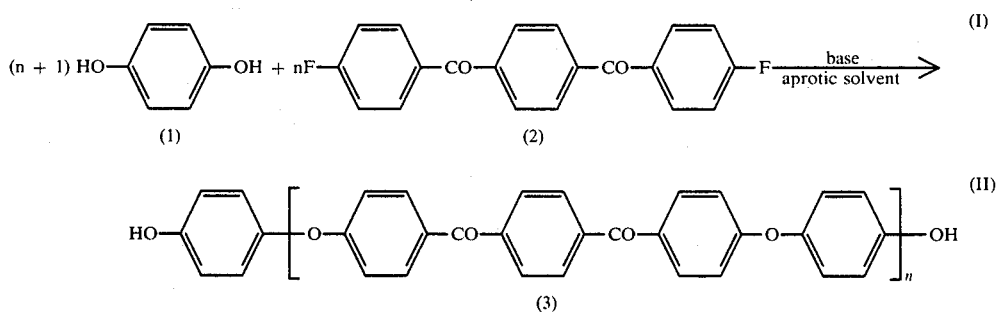

The intermediate (3) can be prepared at any desired molecular weight. The higher the excess of the hydroquinone reactant, the lower the molecular weight of the resulting precursor. In the second step, the dihydroxyl terminated precursor (3) is extended to the desired high molecular weight poly(aryl ether ketone)(5) by condensation with a different activated dihaloaromatic compound, i.e.

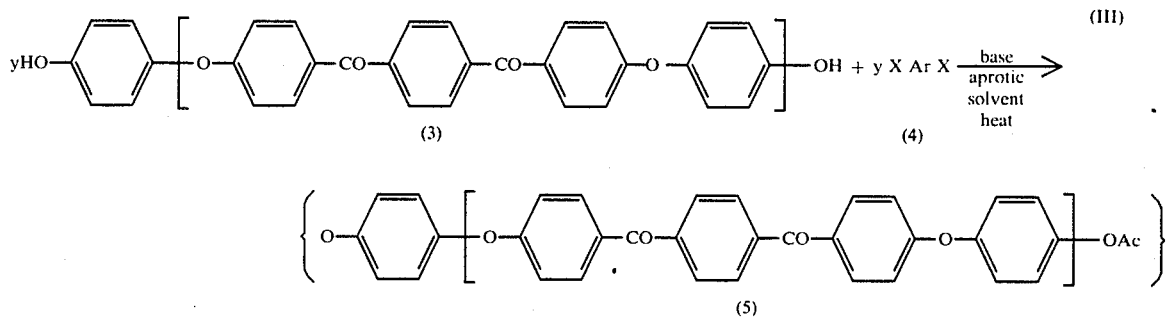

In the formulae above X denotes a halogen such as chlorine, fluorine, bromine, or nitro; and Ar is a divalent aromatic residue containing electron-withdrawing groups in positions ortho and/or para to the halogen or nitro functions, with the proviso that Ar cannot be the residue of 1,4-bis(p-fluorobenzoyl)benzene.

It is to be noted that the steps depicted in the equations (I) and (II) can be performed either with the isolation of the intermediate (3), or in a one-pot operation in which the preparation of the precursor is followed directly by its coupling to the final copolymer (5). Obviously, mixtures of two or more coupling agents of the formula (4) can also be used in the process of the instant invention.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid ring or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group is employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma value, as set forth in J. F. Bunnett in Chem. Rev. 49, 273 (1951) and Quart. Rev., 12, 1 (1958). See also Taft, Steric Effects in *Organic Chemistry*, John Wiley & Sons (1956), chapter 13; Chem, Rev., 53, 222; JACS, 74, 3120; and JACS, 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine, (b) divalent groups which can activate displacement of halogens or nitro groups on two different rings, such as the sulfone group;

the carbonyl group

the vinylene group;

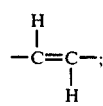

the sulfoxide group

the azo group —N=N—; the saturated fluorocarbon groups —CF₂CF₂—; organic phosphine oxides:

tial preparation of a dihalo-terminated precursor (9)-equation (III):

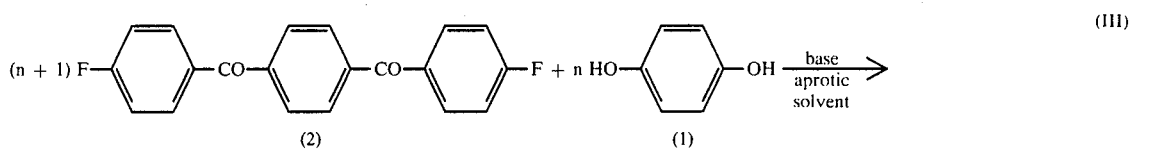

(III)

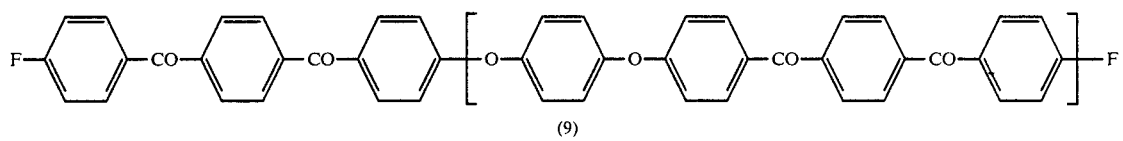

The molecular weight of (9) can be controlled in a manner similar to that utilized for the control of the molecular weight of (3). Precursor (9) is condensed either after isolation and purification or directly as prepared, with a diphenol or a mixture of diphenols to give the final copolymer-equation (IV).

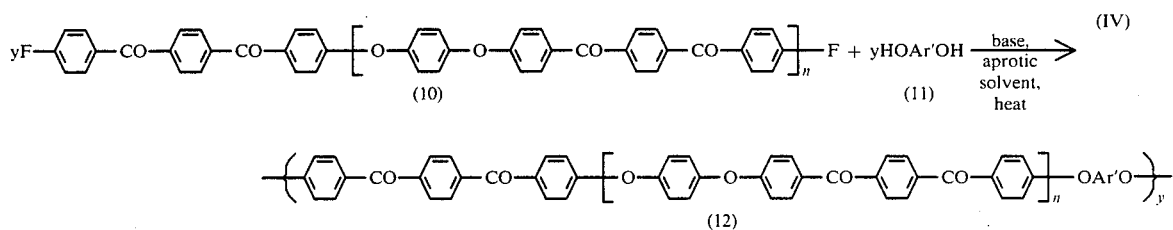

(IV)

where $R_2$ is a hydrocarbon group, and the ethylidene group

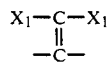

where $X_1$ can be hydrogen or halogen, and activating groups within the nucleus which can activate halogens or nitro functions on the same or adjacent ring such as in the case with difluorobenzoquinone, 1,4- or 1,5- or 1,8-difluoroanthraquinone, etc.

The preferred coupling agents are represented by the formulae (6), (7) and (8).

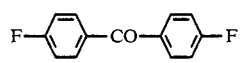 (6)

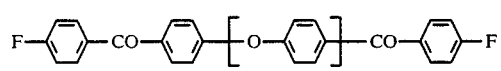 (7)

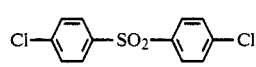 (8)

where m is 1 to 3.

The most preferred coupling agents are selected from the group of the difluoro-compounds (6) and (7).

The molecular weight of the precursor (3) can vary from as low as that of a dimer (i.e., when n=2) to as high as about 10,000.

An alternative preparation of the coupled poly(aryl ether ketones) of the instant invention involves the ini- In the formulae above the group Ar' is the residue of a diphenol different from hydroquinone. The diphenol can be, for example, a dihydroxydiphenyl alkane or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately "bisphenols" are also highly valuable and preferred. These materials are the bisphenols of a symmetrical or unsymmetrical joining group, the latter, for example, being an either oxygen (—O—), carbonyl,

sulfone,

or hydrocarbon residue in which the two phenolic nuclei are joined to the same or different carbon atoms of the residue. Such dinuclear phenols can be characterized as having the structure:

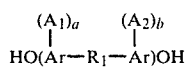

wherein Ar is an aromatic group and preferably is a phenylene group, $A_1$ and $A_2$ can be the same or different inert substituent groups such as alkyl groups having from 1 to 4 carbon atoms, halogen atoms, i.e., fluorine, chlorine, bromine or iodine, or alkoxy radicals having from 1 to 4 carbon atoms, a and b are integers having a value of from 0 to 4, inclusive, and $R_1$ is representative of a bond between aromatic carbon atoms as in a dihydroxy-diphenyl, such as 4,4', 3,3', or 4-3'-dihydroxydiphenyl; or is a divalent radical, including, for example, radicals such as

—O—, —S—, —SO—, —S—S—, —$SO_2$, and divalent hydrocarbon radicals such as alkylene, alkylidene, cycloalkylene, cycloalkylidene, or the halogen, alkyl, aryl or like substituted alkylene, alkylidene and cycloaliphatic radicals or an aromatic radical; it may also represent rings fused to both Ar groups.

Examples of specific dihydric polynuclear phenols include among others the bis-(hydroxyphenyl) alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoro-propane, and the like;
di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;
di(hydroxyphenyl)ethers such as bis-(4-hydroxyphenyl)ether, the 4,3', 4,2'-2,2'-2,3'-,dihydroxydiphenyl ethers,
4,4'-dihydroxy-2,6-dimethyldiphenyl ether,bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxy-3,6-dimethoxydiphenyl ether.

di(hydroxydiphenyl)ketones such as the 4,3'-,4,4'-,4,2'-,2,2'-, and 2,3'-dihydroxybenzophenones; dihydroxy-diketones such as 1,4-bis(4'-hydroxybenzoyl)benzene,
4,4'-bis(4''-hydroxybenzoyl)diphenyl ether,
1,3-bis(4'-hydroxybenzoyl)benzene;
mononuclear diphenols such as resorcinol; fused ring polynuclear diphenols such as the dihydroxynaphthalenes, dihydroxyanthracenes, and dihydroxyphenathrenes.

The preferred diphenolic coupling agents correspond to the following formulae:

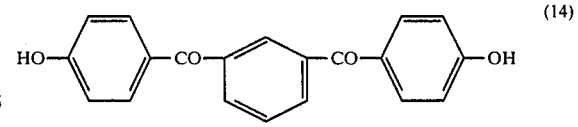

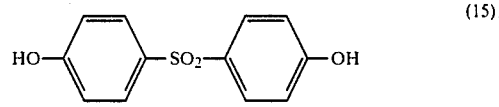

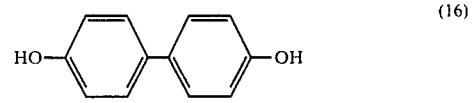

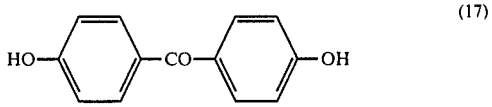

compounds (13), (16) and (17) are most preferred for the purposes of the present invention.

The molecular weight of the precursor (10) can vary from as low as that of the dimer (i.e. when n=2) to as high as about 10,000.

Both the precursors and the final polymers are prepared in solution, using the nucleophilic polycondensation reaction.

The reactions are carried out by heating a mixture of the said monomers or precursor (or precursors) with the appropriate monomers at a temperature of from about 100° to about 400° C. The reactions are conducted in the presence of an alkali metal carbonate or bicarbonate. Preferably a mixture of alkali metal carbonates or bicarbonates is used. When a mixture of alkali metal carbonates or bicarbonates is used, the mixture comprises sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.001 to about 0.20 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salt are employed, where the polymerization temperature is relatively low, e.g. 100° to 250° C., the water should be removed, e.g. by heating under reduced pressure, prior to reaching the polymerization temperatures.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, when using the monomeric or oligomeric diphenols of the instant invention there should be at least 1 mole of carbonate, or 2 moles of bicarbonate, per mole of the aromatic diol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above the amount of the second (higher) alkali metal carbonate or bicarbonate employed is such that there are 0.001 to about 0.2 gram atoms of the alkali metal of higher atomic number per gram atom of sodium.

Thus when using a mixture of carbonates, e.g. sodium carbonate and cesium carbonate, there should be 0.1 to about 20 moles of cesium carbonate per 100 moles of sodium carbonate. Likewise when using a mixture of a bicarbonate and a carbonate, e.g. sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of the mixed carbonate to be employed.

Preferably, from 0.005 to 0.1 gram atoms of the alkali metal of the second alkali metal carbonate or bicarbonate per gram atom of sodium is used.

Where the oligomeric bisphenol or the oligomeric dihalobenzenoid compound are employed, they should be used in substantially equimolar amounts with respect to the monomeric chain extending reagent. Excesses lead to the production of lower molecular weight products. However, a slight excess, up to 5 mole %, of any of the reagents may be employed if desired.

The reaction is carried out in the presence of an inert solvent.

Preferably the solvent employed is an aliphatic or aromatic sulfoxide or sulfone of the formula $$R-S(O)_x-R'$$

where x is 1 or 2 and R and R' are alkyl or aryl groups and may be the same or different. R and R' may together form a divalent radical. Preferred solvents include dimethyl sulfoxide, dimethyl sulfone, sulfolane (1,1 dioxothiolan), or aromatic sulfones of the formula:

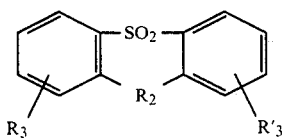

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylsulfonyl biphenyl. Diphenylsulfone is the preferred solvent. Other solvents that may be used include N,N'-dimethyl acetamide, N,N-dimethyl formamide and N-methyl-2-pyrrolidone.

The polymerization temperature is in the range of from about 100° to about 400° C. and will depend on the nature of the reactants and the solvent, if any, employed. The preferred temperature is above 270° C. The reactions are generally performed under atmospheric pressure. However, higher or lower pressures may be used.

For the production of some polymers, it may be desirable to commence polymerization at one temperature, e.g. between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions it is preferred that the maximum polymerization temperature be below 350° C.

The polymerization reaction may be terminated by mixing a suitable end capping reagent, e.g. a mono or polyfunctional halide such as methyl chloride, t-butyl chloride or 4,4-dichlorodiphenylsulphone with the reaction mixture at the polymerization temperature, heating for a period of up to one hour at the polymerization temperature and then discontinuing the polymerization.

This invention is also directed to an improved process for making the chain-extended polymers in comparatively shorter reaction times overall than by using potassium fluoride alone or by using a combination of sodium carbonate or bicarbonate and a second higher alkali metal carbonate or bicarbonate.

Specifically, this process is directed to preparing the poly(aryl ether ketone) precursors and the chain-extended polymers by the reaction of a mixture of the hydroquinone and 1,4-bis(p-fluorobenzoyl)benzene (to make the precursor), or the reaction of the precursor to make the chain-extended polymer either one or both in the presence of a combination of sodium carbonate and/or bicarbonate an alkali metal halide selected from potassium, rubidium, or cesium fluoride or chloride, or combinations thereof.

The reaction is carried out by heating a mixture of the monomeric reactants or the block precursor and the monomeric coupling agent as described herein, at a temperature of from about 100° to about 400° C. The reaction is conducted in the presence of added sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate or bicarbonate and potassium, rubidium or cesium fluoride or chloride, or combinations thereof employed should be such that there is at least 1 atom of total alkali metal for each phenol group, regardless of the anion (carbonate, bicarbonate or halide).

Preferably, from about 1 to about 1.2 atoms of sodium for each phenol group is used. In another preferred embodiment from 0.001 to about 0.5 atoms of alkali metal (derived from a higher alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. Further, the chloride salts are less active than the fluoride salts so that more chloride and less fluoride is used.

In the chain-extension process the bisphenol and the dihalobenzenoid (or dinitrobenzenoid) compound, one of which is oglimeric, are employed in substantially equimolar amounts when maximum molecular weight is sought. However, a slight excess, up to 5 mole %, of any of the reactants may be employed if desired. An excess of one over the other leads to the production of low molecular weight products.

The reactions are carried out in the presence of an inert solvent.

The reaction temperature is in the range of from about 100° to about 400° C. and will depend on the nature of the reactants and the solvent. The preferred temperature is above 250° C. The reactions are preferably carried out at ambient pressure. However, higher or lower pressure can also be used. The reaction is generally carried out in an inert atmosphere.

For the production of some chain-extended polymers it may be desirable to commence reaction at one temperature, e.g. between 200° and 250° C. and to increase the temperature as reaction ensues. This is particularly necessary when making higher molecular weight polymers having only a low solubility in the solvent. Thus, there it is desirable to increase the temperatures progressively to maintain the polymer in solution as its molecular weight increases.

The polymers of this invention may include mineral fillers such as carbonates including chalk, calcite and dolomite; silicates including mica, talc, wollastonite; silicon dioxide; glass spheres; glass powders; aluminum, clay; quartz; and the like. Also, reinforcing fibers such as fiberglass, carbon fibers, and the like may be used. The polymers may also include additives such as titanium dioxide; thermal stabilizers, untraviolet light stabilizers, plasticizers, and the like.

The polymers of this invention may be blended with one or more other polymers such as polyarylates, polysulfones, polyetherimides, polyamideimides, polyimides, polyphenylene sulfides, polyesters, polycarbonates, polyamides, polyhydroxyethers and the like.

The polymers of this invention may be fabricated into any desired shape, i.e., moldings, coatings, films, or fibers. They are particularly desirable for use as electrical insulation for electrical conductors.

Also, the polymers may be woven into monofilament threads which are then formed into industrial fabrics by methods well known in the art as exemplified by U.S. Pat. No. 4,359,501. Further, the polymers may be used to mold gears, bearings and the like.

EXAMPLES

The following examples serve to give specific illustrations of the practice of this invention but they are not intended in any way to limit the scope of this invention.

EXAMPLE I

Preparation of Hydroxyl-terminated Oligomer (3)

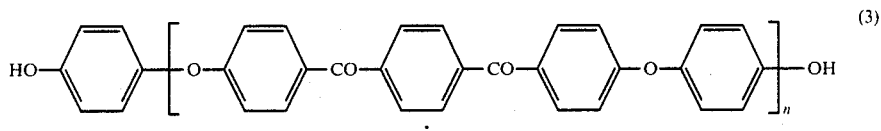
(3)

A 250 ml. 3-neck flask with slanted side arms fitted with a Claisen arm, nitrogen inlet tube, thermocouple probe, condenser, and stainless steel stirrer is charged with 1,4-bis(p-fluorobenzoyl)benzene (0.1104 moles, 35.58 gm), hydroquinone (0.115 moles, 12.66 gm), sodium carbonate (0.1173 moles, 12.43 gm; ground and dried), anhydrous potassium fluoride (0.0293 moles, 1.70 gm) and diphenyl sulfone (100 gm). The apparatus is evacuated and filled with argon by means of a Firestone valve connected to the top of the condenser. A flow of high purity nitrogen is started and the connection to the Firestone valve is replaced with a bubbler. The contents of the flask are heated carefully by means of a heating mantle and temperature controller to melt the diphenyl sulfone. The reaction mixture is stirred and heated to 200° C. and held 30 minutes at that temperature; it is then held at 250° C. for 1 hr., and finally at 270° C. for 2 hours. The reaction mixture is poured from the reaction flask, cooled, ground to a fine powder, and a sample refluxed successively twice with acetone, once with 2% hydrochloric acid, once with water, and washed thoroughly with acetone. It is then dried until constant weight at 120° C. under vacuum (about 20 mm). Based on reactant stoichiometry this oligomer has the structure (3) as depicted above.

EXAMPLE 2

Coupling of the Hydroxyl-terminated Oligomer (3) to High Polymer

The oligomer is prepared essentially as described in the foregoing example. When the 2 hour heating period of 270° C. is completed, 4,4'-difluorobenzophenone (0.0058 moles, 1.27 gm) is added to the stirred reaction mixture along with 8.0 gm of diphenyl sulfone. The reaction mixture is then heated to 290° C., held 30 minutes, and then heated to 320° C. After 1.6 hours the viscous reaction mixture is removed from the flask, cooled, and ground. The reaction product is refluxed successively (500 ml., 1 hr.) with acetone (twice), water, 2% hydrochloric acid, water, and acetone and dried at 110°-120° C. in a vacuum oven overnight (about 15 hours).

The polymer is compression molded and the film (20 mil) is tested for tensile strength and modulus according to ASTM-D-638, yield elongation and elongation at break according to ASTM-D-638, and pendulum impact strength according to ASTM-D-256. Excellent properties are noted.

EXAMPLES 3-7

Preparation of Halogen-terminated Precursors and Their Coupling with Diphenols.

The experimental techniques are the same as those that are used in the examples above. The results are summarized in Table I.

TABLE I

| Example | Mole ratio: 1,4-bis(p-fluorobenzoyl)-benzene/hydroquinone | Coupling Agent |
|---|---|---|
| 3 | 1.02 | 1,4-bis(p-hydroxybenzoyl)benzene |
| 4 | 1.05 | 4,4'-biphenol |
| 5 | 1.04 | 4,4'-dihydroxydiphenyl sulfone |
| 6 | 1.03 | 4,4'-dihydroxydiphenyl ether |
| 7 | 1.05 | 4,4'-dihydroxybenzophenone |

In all instances polymers having good properties are obtained.

What is claimed is:

1. A poly(aryl ether ketone) of the following formula:

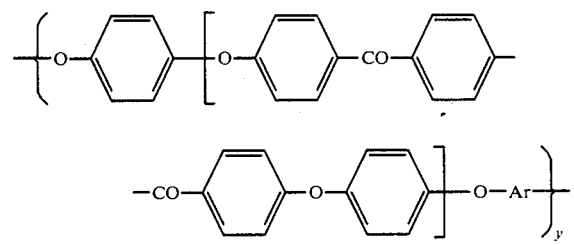

where Ar is a divalent aromatic residue containing electron-withdrawing groups in positions ortho and/or para relative to the carbons bounded to the ether functions with the proviso that Ar cannot be the residuum of 1,4-bis(p-fluorobenzoyl)benzene and y is greater than 1.

2. A poly(aryl ether ketone) as defined in claim 1 wherein Ar is either one or a combination of

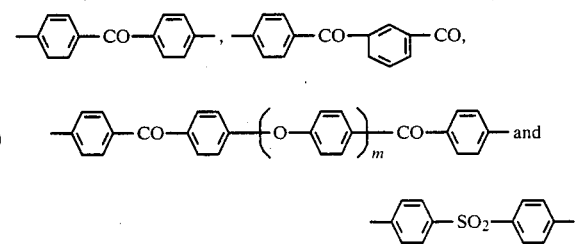

wherein m is 1 to 3.

3. A poly(aryl ether ketone) of the following formula:

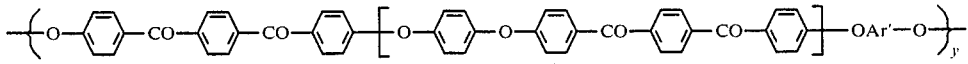

wherein Ar' is the residue of a diphenol with the proviso that it be different from the residuum of hydroquinone, y is greater than 1, and n is at least 2.

4. A poly(aryl ether ketone) as defined in claim 3 where Ar' is either one or a combination of

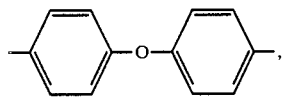

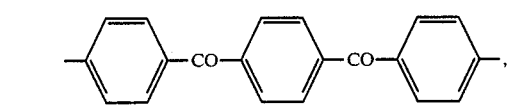

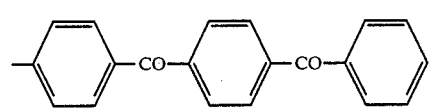

5. A process for preparing the chain-extended poly(aryl ether ketone) of claim 1 which comprises:
(a) reacting an excess of hydroquinone with 4,4'-dihalo or dinitro diketone in the presence of a base and in an aprotic solvent to yield a hydroxyl-terminated intermediate, and
(b) further chain-extending the intermediate obtained in step (a) with an activated aromatic dihalo or dinitro compound which is different from 1,4 bis(p-halobenzoyl)benzene 01 1,4-bis(p-nitrobenzoyl) benzene, in an aprotic solvent and in the presence of a base.

6. A process for preparing the chain extended poly(aryl ether ketone) of claim 3 which comprises:
(a) reacting an excess of 1,4 bis(p-halobenzoyl)benzene or 1,4-bis(p-nitrobenzoyl) benzene with hydroquinone in the presence of a base and in an aprotic solvent to yield a dihalo or dinitro terminated intermediate, and
(b) further chain-extending the intermediate obtained in step (a) in the presence of base and an aprotic solvent with an aromatic dihydroxy compound which is different from hydroquinone.

7. A process as defined in claims 5 and 6 which is conducted in the presence of an alkali metal carbonate and/or bicarbonate or mixtures thereof.

8. A process as defined in claim 7 wherein the alkali metal carbonate is sodium carbonate or bicarbonate and potassium carbonate or cesium carbonate, or mixtures thereof.

9. A process as defined in claim 7 wherein the reaction is carried out in the presence of sodium carbonate and/or bicarbonate and potassium, rubidium or cesium fluorides or chlorides.

10. A process as defined in claims 5 or 6 wherein the aprotic solvent is an aliphatic or aromatic sulphoxide, sulphone, or mixtures thereof.

11. A process as defined in claims 5 or 6 which is carried out in one step.

* * * * *